July 30, 1946.    W. STELZER    2,404,932
BRAKE BOOSTER
Filed Dec. 23, 1943
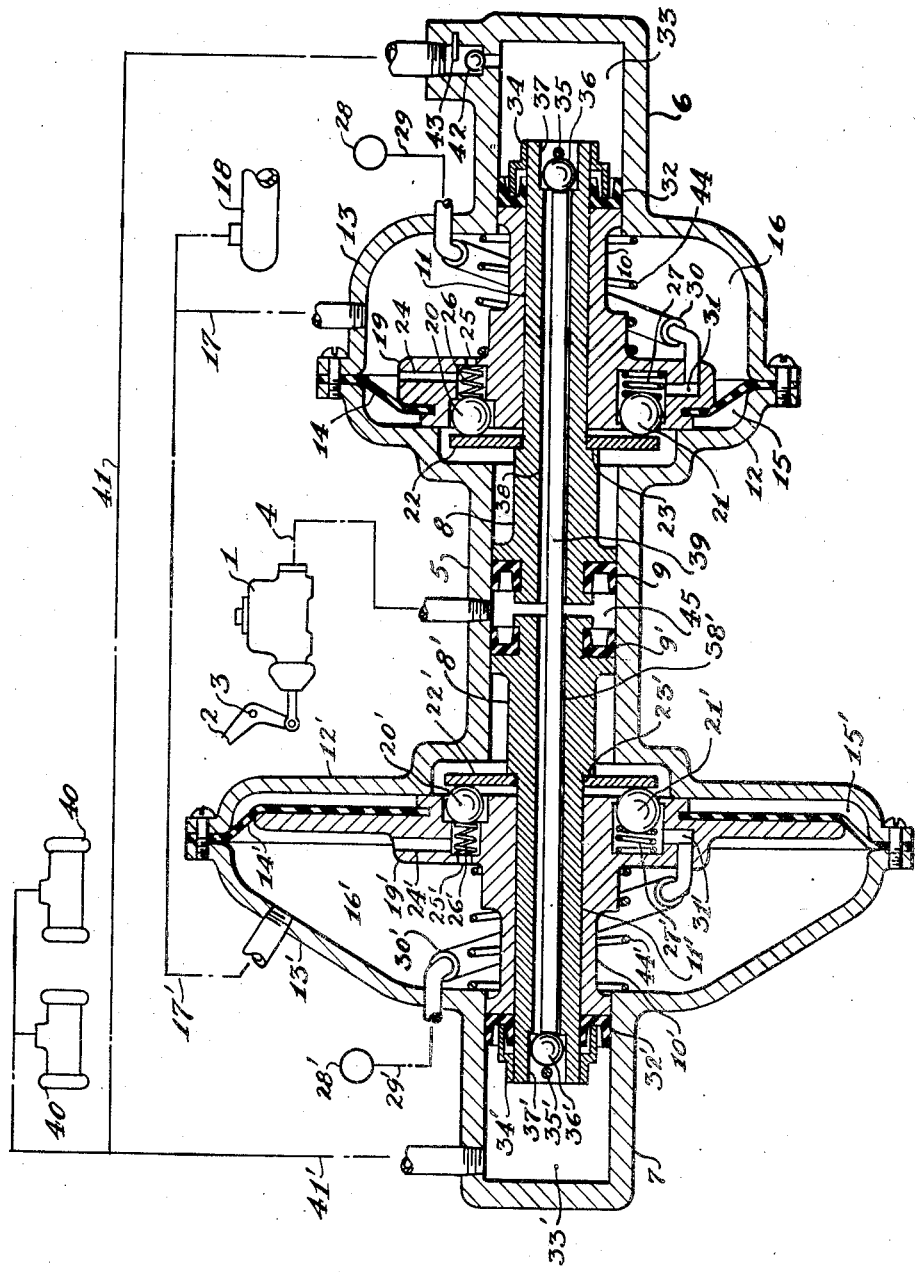
INVENTOR.
William Stelzer Patented July 30, 1946

2,404,932

UNITED STATES PATENT OFFICE 2,404,932

BRAKE BOOSTER

William Stelzer, East Orange, N. J.

Application December 23, 1943, Serial No. 515,328

9 Claims. (Cl. 60—54.5)

The invention relates to brake boosters and more particularly to improved power operated boosters of the compound type to boost the pressure in hydraulic braking systems.

The object of the invention is to provide a pair of boosters, one of which is intended to operate at low pressures while the slack of the brakes is taken up, and the other to take over when the brake shoes are in contact with the drums, being capable to multiply the hydraulic pressure generated by the master cylinder to obtain a maximum braking effort.

Another object is to proportion the boosters so that the low pressure booster transmits a comparatively large volume of hydraulic fluid at low pressure, and the high pressure booster transmits a comparatively small volume of hydraulic fluid at high pressure, the purpose of this arrangement being to save power and to produce a construction which is capable of high capacity and yet may be reduced in size.

Other objects and advantages of this invention will be apparent from the following description considered in connection with the accompanying drawing submitted for the purpose of illustration and not to define the scope of the invention, reference being had for that purpose to the subjoined claims. In the drawing, wherein similar reference characters refer to similar parts throughout the several views:

The figure is a cross-sectional side elevation of the boosters, the rest of the hydraulic braking system being illustrated diagrammatically.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

Describing the invention now in detail, and referring to the figure, there is shown a conventional master cylinder 1 operated by the operator by means of brake pedal 2 pivoted at 3. A hydraulic brake line 4 leads from the master cylinder to the boosters which in the embodiment shown are combined into a single structural unit comprising a primary pressure cylinder 5 and coaxial secondary pressure cylinders 6 and 7 with expansible chamber motor mechanisms interposed. Excepting the proportion between the hydraulic cylinders and the expansible chamber motor mechanisms, both boosters are alike, so that the description of one automatically also applies to the other. The description refers to the low pressure booster which is the one that is in operation while the shoes expand to contact the brake drums, corresponding parts belonging to the high pressure booster being identified with a prime ('). Both boosters have the primary pressure cylinder 5 in common, or it may be considered that the primary cylinders of both boosters are joined together. Within cylinder 5 slides a control piston 8 provided with a seal 9 and extending into the secondary pressure cylinder in which slides a power piston 10 having a central bore 11 in which piston 8 is adapted to slide a short distance. The expansible chamber motor mechanism intermediate cylinders 5 and 6 comprises a circular flange or shell 12 extending from cylinder 5, a circular shell or housing 13 extending from cylinder 6, with a diaphragm 14 interposed dividing the motor mechanism into a working chamber 15 and a vacuum or reservoir chamber 16, the latter being connected through line 17 to a source of suction such as the intake manifold 18 of an internal combustion engine. The central portion of diaphragm 14 is secured to the diaphragm plate 19 which extends outwardly from piston 10 and houses follow-up valves 20 and 21 engaged by a valve actuating plate 22 having a central hole to fit freely over the smaller part of piston 8 whereby the latter engages the plate at 23. Valve 20 serves to control the communication between chambers 15 and 16 through passages 24 and 25, being held open by means of spring 26. Valve 21 is ordinarily held in a closed position by spring 27 and controls the admission of air from a source of pressure 28, such as the atmosphere, through line 29, flexible hose 30, and passage 31 to chamber 15. Piston 10 is provided with a seal 32 which also serves to seal the small end of control rod 8 extending into chamber 33 of cylinder 6. The seal is retained by a retainer 34 pinned to piston 8 with a pin 35 preventing check valve ball 36 from falling out of bore 37 which houses it. Piston 8 has a central hole 38 in which is placed a single rod 39 serving both boosters and extending from ball 36 to ball 36', keeping both of them unseated when the boosters are in the retracted or starting position, as shown.

Chamber 33 is in communication with the wheel cylinders 40 through line 41, where a check valve 42 is interposed, allowing fluid to flow from chamber 33 to the wheel cylinders but not vice versa. A pin 43 serves to retain ball 42. Cylinder 7 is not provided with a check valve. Spring 44 urges the pistons into the retracted position.

As indicated on the drawing, the motor mechanism of the low pressure booster is smaller than that of the high pressure booster. It is apparent that a similar proportion would be maintained between cylinders and motor mechanism if both motor mechanisms were of the same size but the hydraulic cylinders of the low pressure booster were larger and those of the high pressure booster were smaller. In order that the low pressure booster goes into operation before the high pressure booster, it is necessary that spring 27' is stronger than spring 27. By studying the operation of the boosters it will become apparent that the retraction of piston 10 from the extended position occurs solely by virtue of spring 44. Therefore, I prefer to make the bore of chamber 33 slightly larger than that of chamber 45, thereby the existing hydraulic pressure assists in returning the pistons, as soon as the motor mechanism is deenergized.

In operation, the booster is in the released or starting position when the brakes are released, as shown. Supposing now that the operator depresses the brake pedal, the hydraulic pressure produced by master cylinder 1 is transmitted through hydraulic line 4 to chamber 45, and from there through passages 38 and 38', chambers 33 and 33', and lines 41 and 41' to wheel cylinders 40 to actuate the brakes. The hydraulic pressure in chamber 45 acting on piston 8 moves the latter towards the right against the opposition of the hydraulic pressure in chamber 33 acting on the small end of piston 8. Piston 8 actuates plate 22. Spring 26 being weaker than 27, it yields first, so that valve 20 becomes seated, whereby plate 22 pivots on ball 21 and is contacted by shoulder 23 only at its lower portion. After ball 20 is seated it becomes the pivot point for plate 22 and further movement of piston 8 causes ball 21 to unseat so that air is permitted to enter from 28 into chamber 15 to urge diaphragm 14 and pistons 19 and 10 towards the right in unison with piston 8. This movement permits the seating of valves 36 and 36' whereby the hydraulic pressure in chambers 33 and 33' may now be increased to a predetermined multiple of the master cylinder pressure. The ratio between the primary or master cylinder pressure and the secondary or boosted pressure depends on the proportion of the area of piston 8 subject to the hydraulic pressure in chamber 45 and the smaller area responsive to the hydraulic pressure in chamber 33. Thus as soon as the pressure in chamber 33 exceeds a certain multiple of the pressure produced by master cylinder 1, the movement of piston 8 is retarded so that valve 21 is permitted to close to stop the flow of air to chamber 15. As pistons 8 and 10 enter into cylinder 6, the fluid displaced in chamber 33 is forced to wheel cylinders 40 to force the brake shoes against the brake drums. After the shoes are in contact with the drums and brake pedal 2 is further depressed, the hydraulic pressure increases, not only in the wheel cylinders but also in master cylinder 1. Due to the increased pressure which urges piston 8' towards the left, first spring 26' and then 27' yields so that communication between chambers 15' and 16' is interrupted and air is admitted to chamber 15' to force diaphragm 14' and piston 10' towards the left to follow piston 8'. Thus at this stage hydraulic fluid is forced from both chambers, 33 and 33', to the wheel cylinders. Since the motor mechanism of the low pressure booster is of relatively small size, a condition is soon reached where full atmospheric pressure exists in chamber 15 and the pressure cannot be further increased so that pistons 8 and 10 stop and ball 42 becomes seated because the flow of fluid from chamber 33 to wheel cylinders 40 has ceased. However, the high pressure booster at the left continues to operate so that the hydraulic pressure in chamber 33' is further increased to obtain a maximum braking effort commensurate with the pedal pressure. Ball 42 prevents the fluid under higher pressure to back up into chamber 33.

After the operator releases pedal 2, the pressure in chamber 45 is relieved, causing pistons 8 and 8' to yield so that air valves 21 and 21' close and then vacuum valves 20 and 20' open to equalize the pressures in chambers 15 and 16, and 15' and 16'. Due to the existing pressure in chamber 33' the pistons of the high pressure booster return to the starting position. The pistons of the low pressure booster return due to the force of spring 44, and if the bore of cylinder 6 is slightly larger than that of cylinder 5 some assistance is gained from the hydraulic pressure existent in chamber 33. During this retractile movement hydraulic fluid must flow from chamber 45 through hole 38 into chamber 33, unseating ball 36. When the pistons of both boosters have reached the released, or starting position, rod 39 forces balls 36 and 36' apart so that hydraulic fluid still under pressure in the wheel cylinders may flow through chamber 33', hole 38', and chamber 45 back to the master cylinder.

I claim:

1. In a hydraulic braking system having wheel cylinders to actuate the brakes, a master cylinder, a power operated low pressure booster connected to said master cylinder to receive fluid therefrom and having means to transmit fluid under higher pressure to said wheel cylinders, a power operated high pressure booster connected to said master cylinder to receive fluid therefrom and having means to transmit fluid under higher pressure to said wheel cylinders, a control device for each of said boosters operable by fluid displaced from said master cylinder, and so constructed and arranged that operation of said low pressure booster occurs prior to operation of said high pressure booster, and a check valve intermediate said wheel cylinders and said low pressure booster to prevent the return of fluid from the former to the latter.

2. In a hydraulic braking system having wheel cylinders to actuate the brakes, a master cylinder, a power operated low pressure booster connected to said master cylinder to receive fluid therefrom and having means to transmit fluid under higher pressure to said wheel cylinders, a power operated high pressure booster connected to said master cylinder to receive fluid therefrom and having means to transmit fluid under higher pressure to said wheel cylinders, a control device for each of said boosters operable by fluid displaced from said master cylinder, and so constructed and arranged that operation of said low pressure booster occurs prior to operation of said high pressure booster, a check valve intermediate said wheel cylinders and said low pressure booster to prevent the return of fluid from the former to the latter, and valve means to provide for the return of fluid from said wheel cylinders to said master cylinder when said boosters are released.

3. In a hydraulic braking system having wheel cylinders to actuate the brakes, a master cylinder, a low pressure booster connected to said master cylinder to receive fluid therefrom, a motor mechanism to operate said low pressure booster, a high pressure booster connected to said master cylinder to receive fluid therefrom, a motor mechanism to operate said high pressure booster, fluid transmitting means connecting both of said boosters to said wheel cylinders, a control device for each of said motor mechanisms subject to operation by fluid displaced from said master cylinder and so constructed and arranged that operation of the motor mechanism of said low pressure booster occurs prior to operation of the other motor mechanism, check valve means to prevent the flow of fluid from said high pressure booster to said low pressure booster, and means for returning fluid from said wheel cylinders to said master cylinder when said boosters are released.

4. In a hydraulic braking system having wheel cylinders to actuate the brakes, a master cylinder, a low pressure booster, a motor mechanism to operate said low pressure booster, a high pressure booster, a motor mechanism to operate said high pressure booster, a control device for each motor mechanism connected to the master cylinder to be operated by fluid therefrom, and fluid transmitting means connecting both of said boosters to said wheel cylinders, the motor mechanism of said low pressure booster being relatively small to produce relatively limited pressures in said wheel cylinders, said high pressure booster being proportioned to transmit to the wheel cylinders a volume of fluid which is small relative to the power capacity of its motor mechanism to produce a maximum pressure in said wheel cylinders, the control device for the motor mechanism of said low pressure booster being constructed to operate first to energize such motor mechanism when master cylinder pressures are relatively low, the control device for the motor mechanism of said high pressure booster being adapted to operate to energize the latter motor mechanism when the master cylinder pressures are increased.

5. In a hydraulic braking system having wheel cylinders to actuate the brakes, a master cylinder, a booster unit comprising a high pressure mechanism and a low pressure mechanism, said booster unit having a control chamber connected to said master cylinder, each such mechanism comprising a pressure chamber and a motor device for reducing the capacities of said chamber, the motor device of said low pressure mechanism being of smaller capacity than the other motor mechanism, means connecting said pressure chambers to the wheel cylinders, and a control means for each motor device, each control means being operable by fluid displaced into said control chamber from said master cylinder, said control means for the motor device of said low pressure mechanism being operable by a lower master cylinder pressure than the control means for energizing the motor device of said high pressure mechanism.

6. Apparatus constructed in accordance with claim 5 wherein each booster mechanism is provided with a check valve providing for the flow of fluid from said control chamber to the wheel cylinders, and common means for opening said check valves when said motor devices are in their "off" positions.

7. In a hydraulic braking system having wheel cylinders to actuate the brakes, a master cylinder, a booster unit comprising a pair of booster mechanisms, said booster unit having a control chamber communicating with said master cylinder, each booster mechanism having a control piston subject to movement by fluid entering said control chamber, each booster mechanism further comprising a motor device having a power movable unit including a pressure piston, a pressure cylinder in which each of said pressure pistons operates, means connecting said pressure cylinders to said wheel cylinders, and a control device for each motor device operable by the associated control piston, the control device for the motor device of said low pressure mechanism being operable by a lower master cylinder pressure than the other control device.

8. Apparatus constructed in accordance with claim 7 provided with a check valve preventing the flow of fluid from the wheel cylinders into the pressure cylinder of said low pressure mechanism, each control piston projecting axially through the associated pressure piston to displace fluid from the associated pressure cylinder.

9. Apparatus constructed in accordance with claim 7 wherein said control pistons are in axial alignment and each is provided with an axial passage communicating between said control chamber and the pressure cylinder of the associated mechanism, a check valve for the passage of each control piston opening away from said control chamber, and common means for opening said check valves when said control pistons are in their "off" positions.

WILLIAM STELZER.